D. G. LORRAINE.
OIL, GAS, AND SAND SEPARATOR.
APPLICATION FILED JULY 18, 1921.
Reissued Nov. 8, 1921.
15,220.
2 SHEETS—SHEET 1.
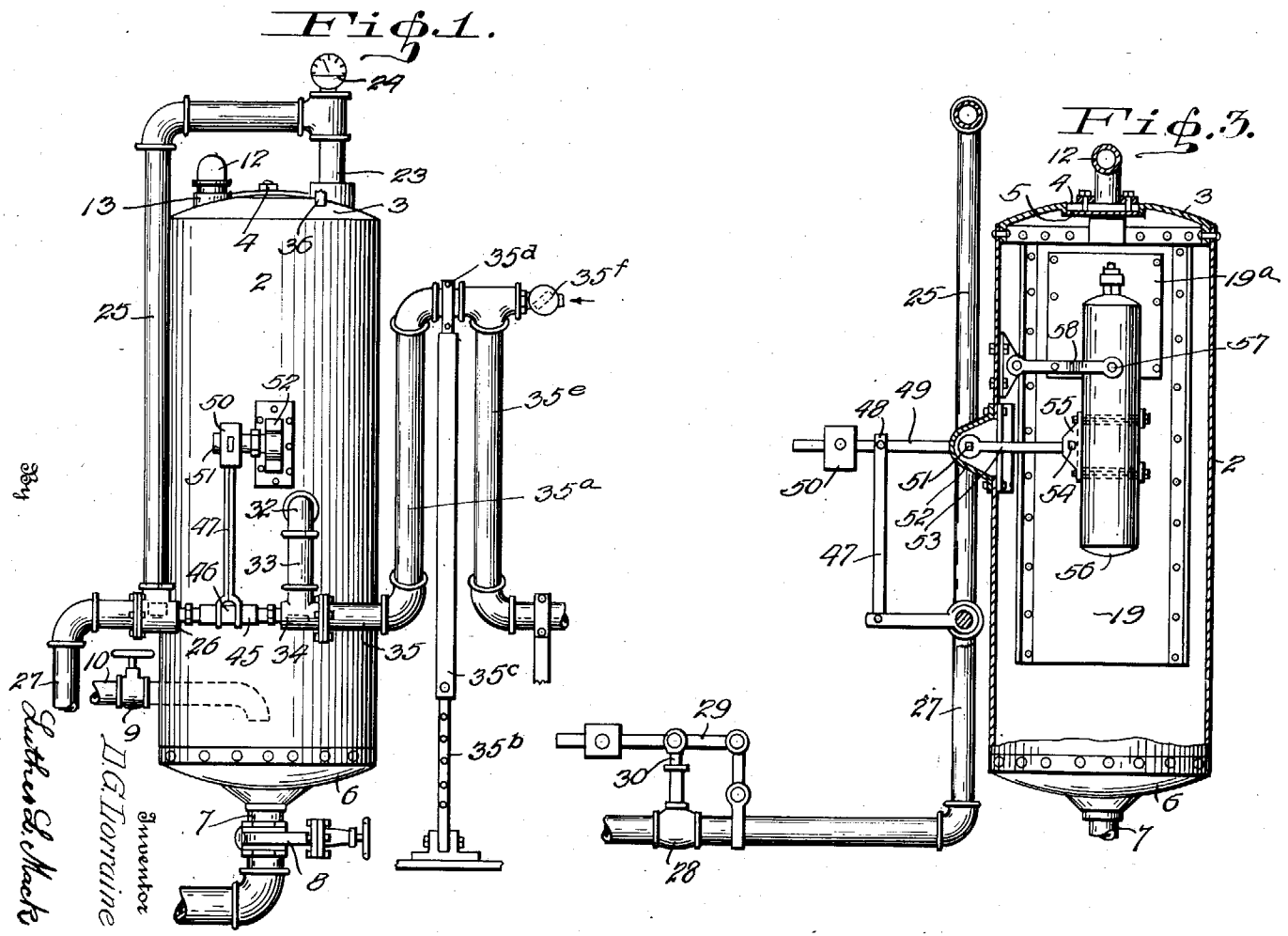
Inventor
D. G. Lorraine
By Luther L. Mack
Attorney D. G. LORRAINE.
OIL, GAS, AND SAND SEPARATOR.
APPLICATION FILED JULY 18, 1921.
Reissued Nov. 8, 1921.
15,220.
2 SHEETS—SHEET 2.
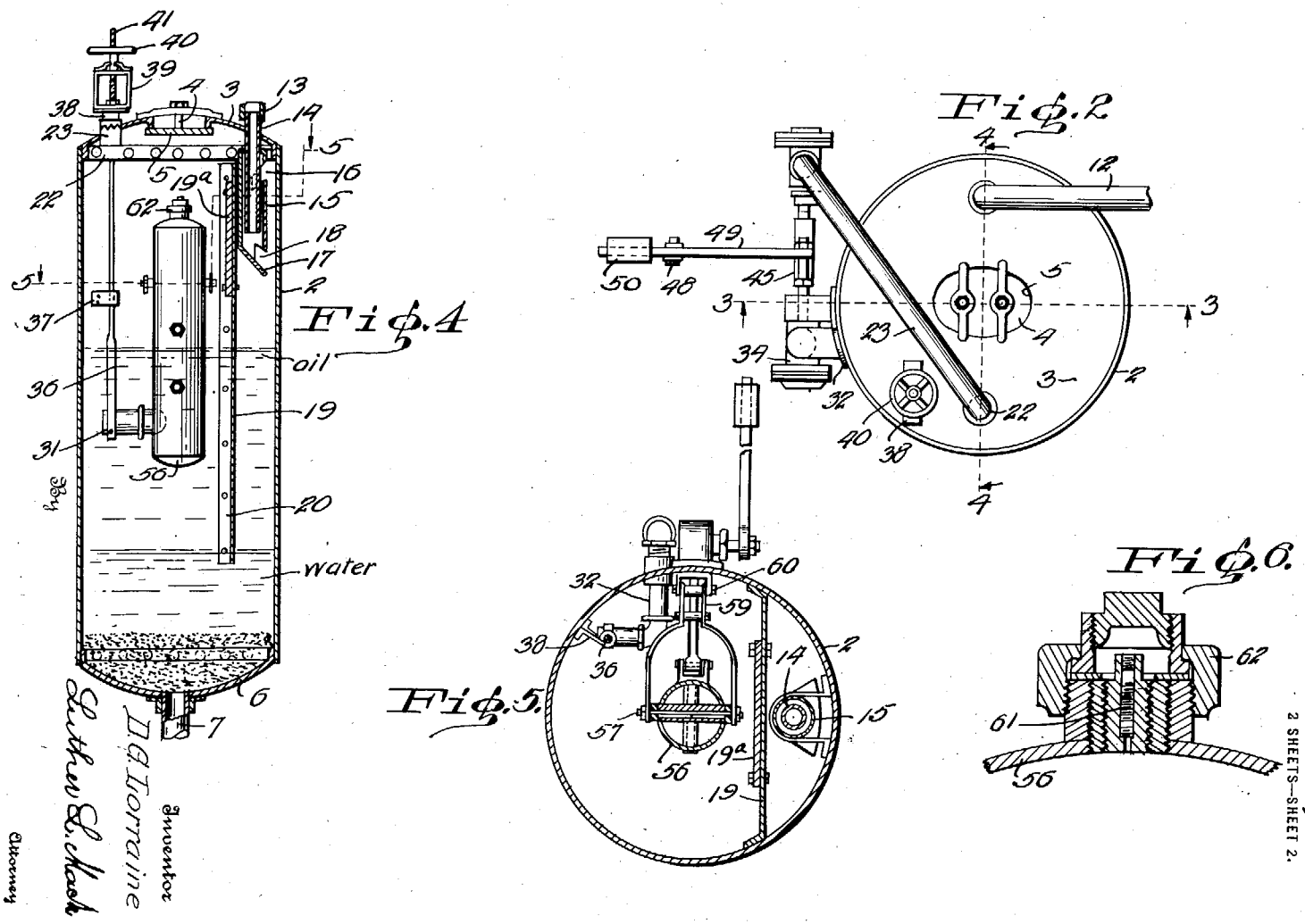
Inventor
D. G. Lorraine
By Luther L. Mack
Attorney

UNITED STATES PATENT OFFICE.

DAVID G. LORRAINE, OF LOS ANGELES, CALIFORNIA.

OIL, GAS, AND SAND SEPARATOR.

15,220. Specification of Reissued Letters Patent. Reissued Nov. 8, 1921.

Original No. 1,373,664, dated April 5, 1921, Serial No. 356,438, filed February 5, 1920. Application for reissue filed July 18, 1921. Serial No. 486,317.

*To all whom it may concern:*

Be it known that I, DAVID G. LORRAINE, a citizen of the United States, and a resident of Los Angeles, in the county of Los Angeles and State of California, have invented new and useful Improvements in Oil, Gas, and Sand Separators, of which the following is a specification.

This invention relates to and has for a primary object the provision of an apparatus for the efficient separation of gas and oil from oil wells, where the same is not in the form of emulsion, and does not contain sand and water and without pressure, and adaptable also for the purpose without modification, for maintaining a pressure whereby an emulsion may be broken up into its constituent elements.

It will be understood in the consideration of my invention that it is necessary and desirable to treat the oils obtained from the oil wells so as to thoroughly separate the gas and oil for different uses and so as to remove from the volume of oil all traces of water and sand which may be ejected from the well with the oil. To this end it is an object of my invention to provide an apparatus embodying a receptacle into which the volume of oil and accompanying substances is delivered from the well, for the purpose of separating the gas, water and sand therefrom. Said receptacle is preferably of substantial size and contents, so that a maximum volume of oil may be treated therein during the operation of the apparatus, and the separating operation facilitated.

Heretofore gas and oil separators have been so arranged as to provide a relatively shallow volume of oil, so that only a small volume may be treated at one operation, for the separation of the gas and other elements therefrom, and it is an object of my invention therefore to provide a receptacle of ample capacity, whereby a large volume and a substantially uniform level of oil may be maintained at a point above the mean elevation of the receptacle and in the major portion thereof, thereby rendering it possible to separate the gas from a maximum volume of oil. The upper and minor portion of the receptacle constitutes a gas collection or accumulation chamber from which the gas liberated from the oil is delivered by a suitable means to points remote from the separator for use.

It is a further object of my invention to sub-divide the interior of the gas and oil receptacle into two separate segmental chambers, by means of a vertical partition arranged therein and in communication at the top of the receptacle with the gas collection chamber, and at the bottom thereof with the oil receiving portion of the receptacle. The oil with its constituent elements is delivered from the well into the upper partition of the receiving chamber on one side of the said partition, which is relatively smaller than the other chamber of the receptacle, and the oil or emulsion rises to a higher level in the receiving chamber than the level of the volume of oil in the main chamber.

The arrangement of the said partition prevents the disturbance of the main volume of oil and permits the settling of the sand and water to the bottom of the tank, while the injection of the oil and its constituent elements from the well into the receiving chamber of the receptacle liberates a large volume of gas, as the oil enters the receptacle and thus the gas liberated collects in the upper portion of the receptacle. The heavier elements settle to the bottom of the tank and rise to and maintain a substantially uniform level in the main chamber thereof.

It is a further object of my invention to provide in an apparatus of the character described, means whereby the emulsified oil from oil wells may be injected by the natural pressure of the wells into and treated under pressure in the separating receptacle, for breaking up the emulsion into its constituent elements, so that the oil and valuable ingredients thereof may be withdrawn for use, and the other elements separated therefrom and whatever gas may be contained in the emulsion may be collected in the gas chamber of the receptacle.

Still another object of my invention is to provide effectual means for automatically controlling the discharge of the oil and gas from the apparatus separately and especially to provide a float device adapted to withstand the pressure that may remain within the separating receptacle and whereby the discharge of the gas and oil is effectually controlled.

Another object is to provide in an apparatus of the character mentioned, a receptacle having means capable of being employed for the separation of gas, oil, sand and water, and the accumulation of the gas in the upper portion of the receptacle without any pressure for the purpose of expelling the same for use, and also capable of being employed for demulsifying oils and reducing the same to their constituent elements, when the emulsion is supplied to the separating receptacle under pressure from the wells and whereby a substantial back pressure may be maintained in the gas discharge line for holding emulsion under a greater pressure within the receptacle than is necessary in the case of the separation of oil and gas in other forms than emulsion.

Another object of the invention is to provide hydrostatic means for separating the gas and oil and for preventing the loss of gas with the outwardly passing oil and to provide such a hydrostatic means readily variable to afford different heads of oil pressure to overcome the interior pressure during the operation of the apparatus, without overflowing the receptacle.

Another object of the invention is to provide for the minute adjustment of the oil discharge mechanism.

Another object is to provide an organization in which the several parts are simple in construction, readily removable and renewable, and to provide coördinate valve means operative by a single connection with the said pneumatic control means.

A further object of the invention is to provide a novel method for treating oil emulsions to break up and separate the ingredients of the emulsion.

With these and other objects in view the invention consists of the method, the combination and in details and arrangements of the parts, an embodiment of the invention being illustrated in the accompanying drawings and described and claimed herein.

Figure 1 is a side elevation of the improved apparatus.

Fig. 2 is a top plan view of the apparatus.

Fig. 3 is a section on line 3—3 of Fig. 2.

Fig. 4 is a section on line 4—4 of Fig. 2.

Fig. 5 is a section on line 5—5 of Fig. 4.

Fig. 6 is a detail sectional view of the upper portion of the pneumatic float.

The apparatus includes, preferably, an upright cylindrical tank or receptacle 2 of any suitable dimensions having a head 3 with a manhole 4 which is shown in Fig. 2 as closable by a manhole plate 5. The lower end of the tank is provided with a bottom 6 having a central outlet pipe 7 in which is provided a cut-off valve 8 which, when opened, will provide for the washing out of such material as sand or other substance collecting in the bottom of the receptacle 2 and which discharge may be facilitated by the introduction of water or other fluid under pressure by the opening of a valve 9 arranged in a pressure pipe 10 at one side, and in the lower portion, or the receptacle 2.

Oil or emulsion to be treated is introduced, preferably, through the top 3 of the receptacle to which is connected a supply pipe 12 leading in through a connection 13 on the top of the receptacle and which connection is shown in Fig. 4 as including a downwardly extending tube 14 which may have around its lower end a sleeve or hood 15 provided at its upper portion with a gas outlet 16; the lower end of the sleeve 15 may have an inclined bottom 17 below the open mouth 18 formed in the side of the sleeve and which mouth is disposed toward the adjacent surface of the wall of the receptacle 2.

The inlet sleeve 15 is arranged, as shown in Figs. 2 and 4, as in close juxtaposition to one side of the cylindrical receptacle; and extending vertically and transversely across this receptacle there is provided a partition wall 19, the flanges 20 of which may be riveted or otherwise secured, as at 21, to the interior surface of the receptacle 2.

The lower end of this partition 19 may terminate or have communication with the opposite chamber well above the bottom of the receptacle and the partition forms a confined vertical passageway or chamber down which the oil issuing from the mouth 18 of the inlet sleeve 15 is directed and is caused to pass beneath the lower edge of, or through the partition 20 before the lighter materials, such as gas and oils, can rise to a predetermined variable height in the receptacle. This enables the sand that may be contained in the oil or emulsion, coming from the supply pipe 12, to settle toward the bottom while the oil passes around the lower edge of or through parts in the partition and ascends in the larger compartment formed on the opposite side of the partition. The upper end of said partition may also terminate short of the top of the receptacle or have parts there in communication with the gas chamber.

The accumulating gases ascending to the top and minor portion of the receptacle pass into an outlet 22 and into a gas pipe 23 in which may be provided a gage 24. The outwardly passing gas flows down a pipe 25 in the lower end of which is mounted a valve 26 controlling the flow from the receptacle 2. From the valve 26 is continued a delivery gas pipe 27 in which there is mounted a valve 28, Fig. 3, designed to hold a predetermined back pressure in the gas line and receptacle 2; the valve, in this case, being provided with a weight lever arm 29 connected to the stem 30 of the valve.

Oil is discharged from the receptacle through an adjustable outlet consisting, in this case, of an elbow 31 turnable about an axis in the connection 32 which is extended to the outside of the receptacle 2 and has a downturned branch 33 leading into an oil regulating valve 34 from which the oil passes into a delivery pipe 35.

One of the features of the present invention resides in means for very carefully adjusting the level of the outlet member 31 as by swinging it about its axis in the member 32; and to secure this refinement of adjustment the outlet member has attached to it a link or rod 36 extending up through a guy 37 and thence through a bearing 38, Fig. 2, to which is attached a yoke or other suitable member 39 to which is rotatively secured a handwheel 40 that engages the upper threaded end 41 of the rod 36. Therefore, by turning the handwheel 40 in one or the other direction it will lift or lower the rod 36 and consequently set the opening of the outlet member 31 at a desired position so as to enable the separation or outflow of the oil at or above a desired predetermined level with respect to the liquid content of the receptacle 2, as it is obvious that the oil will vary in clarity according to the specific gravity of its constituents and the upper portion of a mass of oil is therefore clearer than the lower portion, and to secure the separation of this clearer or better quality the outlet member 31 is made adjustable.

A further feature of the present invention resides in the provision of a buoyant yet substantial means for automatically controlling the opening and closing simultaneously of the gas outlet valve 26 and the oil outlet valve 34, and to that end these valves are shown as mounted on a common rock shaft 45 on which is provided a lever 46 to the outer end of which is connected a link 47 the upper end of which is attached at 48 to a lever arm 49 on which may be adjusted a counter-balancing weight 50.

The lever arm 49 is secured to the contiguous end of a short rock shaft 51 mounted in a box 52 attached to the side of the receptacle 2, this box having diverging walls forming a mouth opening to the interior of the receptacle 2, and in this mouth there oscillates a lever 53 attached to the portion of the shaft 51 extending into the box 52. The swinging end of the lever 53 is pivotally connected at 54 to a bearing 55 that is attached to the adjacent side of a pneumatic cylinder or float 56.

For the purpose of stabilizing and maintaining the float cylinder in a vertical position it has connected to it at 57 the side arms of a yoke 58 which has rearwardly extending parallel arms 59 these being pivoted on a bearing 60 arranged within the receptacle 2; the length of the lever device 58 and the lever 53 being substantially equal and therefore holding the float 56 in an upright position and causing it to move in a vertical position at all times as determined by variation of the level of the oil in the receptacle 2.

When treating an emulsion as above mentioned, there is maintained in the receptacle a gas pressure as determined by the adjustment of the pressure regulating valve 28, and it is desirable to provide, therefore, a pneumatic float as 56 which will not only be of a highly buoyant characteristic but also will be able to withstand the exterior pressures applied without crushing, and therefore, the float 56 is made in the form of a hollow cylinder and has at its upper end a check valve 61 that may be covered by a removable cap 62, and the pneumatic float 56 may be charged with compressed air or gas to any desired degree or equal to the maximum at which pressure would be maintained in the receptacle 2.

The operation of the apparatus is substantially as follows:

When treating an emulsion, the valve 28, having been set by its regulating means 29 to hold a given pressure in the receptacle 2 then as the emulson is supplied to the receptacle by the oil supply pipe 12 the latter will be directed down the small compartment through the inlet or feed sleeve 15 by which the oil is showered onto the adjacent portion of the receptacle wall whence it flows downwardly between the wall and the partition 19, any gases being liberated rising to the top of this compartment and passing over the upper end of or through the partition 19 and accumulating in the upper end of the receptacle 2.

The oil mass, or emulsion in some cases, passes beneath the lower end of or through the partition 19 and thus facilitates the deposit or separation of solids such as sand or other heavy substances, and the lighter portion of the oil with the gas and the emulsion rises into the larger compartment of the receptacle and passes upwardly to a level that is determined by the position of the pneumatic float 56. The emulsion will be compressed to a pressure determined by the adjustment of the valve 28 and maintained there, and the emulsion will be broken up into its constituent elements thereby, and as the oil accumulates it will tend to lift the float 56 and through means of the lever arm 53 rock the rock shaft 51 and through means of its connection to the valve shaft 45 rock the latter so as to open or increase the opening of the oil valve 34 and permit the discharge of oil through the outlet member 31 past the valve 34 and to the discharge 35. Thereupon the level of the oil will tend to fall until in such action the float 56 in descending will again tend to close or partially close the oil valve 34 and open or increase the opening of the gas valve 26. This alternate action of the automatic valve mechanism will continue so long as oil is supplied by the main oil pipe 13 to the apparatus. It will be understood, however, that the level of the fluid contents of the main chamber of the receptacle 2 will be at all times substantially uniform, and when the apparatus is properly adjusted this level will be maintained at a point well above the mean elevation of the receptacle so as to insure a maximum volume of oil from which the gas may be liberated and yet provide an ample space for the accumulation of the gas.

From the above it will be seen that I have provided a method for separating or facilitating the separation of the gas and oil and separately discharging the same from emulsion; and furthermore have provided a method in which, by maintaining a predetermined pressure in the oil receptacle, the latter is subjected to pressures having the effect of expressing the gaseous content from emulsions, the gaseous constituent in the emulsion being driven from the denser liquids by the increase in the pressure on the oil within the receptacle 2. This, therefore, prevents the loss of the valuable gaseous constituent such as occurs in apparatus in which the oil passes immediately from a well or other source to an apparatus in which it is subject only to atmospheric pressure.

In the event of treating oils that are not emulsified the valve 28 may be omitted and the gas provided with free outlet without pressure or a static head, or pressure may be secured by maintaining a volume of oil in the discharge pipe 35 by providing the latter with a safety extension $35^a$. This extension is shown as in the form of a U-shaped pipe stem that is turnable from a horizontal to an upright position about the axis of the pipe 35 and may be temporarily and substantially secured in its angular adjustment by a suitable jack comprising for instance a post $35^b$ having a sleeve $35^c$ the upper end of which engages the cross or top section of the siphon tube as at $35^d$.

For the purpose of breaking the siphon effect in one branch as $35^d$ of the tube an inwardly opening check valve $35^f$ is mounted, preferably, in the bend of the siphonic device so that the oil will not be drawn from the branch to which the pipe 35 is connected but will be maintained therein to prevent drawing out of the gas from the receptacle 2.

Preferably water is maintained in the bottom of the receptacle to a level somewhat above the lower end of the sand sheet or partition or the part therein, so that the incoming supply of oil when passing below the lower end of or through the partition is brought into contact with the water and the attrition between the emulsion causes a rapid separation of the gaseous content as the oil and mixture engages the water.

It has been found from practical experience in the operation of this apparatus that there is an increase in the production of oil from some wells because of the uniform flow from the separator which prevents the rapid increment in the quantity of sand ordinarily found in wells, and which increment results in the clogging or jamming of the well and loss of production until the well is blown.

The sand sheet 19 is, preferably, provided with a window opening that may be covered by a cover plate $19^a$ through which the member 15 may be applied and removed when necessary.

It will be understood that frequently the flow from oil wells is not uniform, the flow coming in impulses and varying in extent and pressure, and this occasions the delivery of sand to a more or less extent, which frequently stops the flow of oil from the well.

With the use of my apparatus, however, in connection with an oil well, because of the arrangement of parts and the connection between the well and the separating device, when a well is flowing a substantially uniform flow is maintained at all times, and the delivery of oil from the well is stabilized and prolonged frequently beyond the period of its natural flow, and the impulses are prevented also because of the complete regulation of the flow from the well. When connected with my separator sand is not encountered in sufficient quantities to stop or influence the flow and altogether a more uniform and satisfactory delivery from the well is maintained.

It will be further understood that because of the vertical partition within the separating receptacle and the provision of the separate receiving and separating compartments, the products of the well are delivered into the smaller receiving chamber and all of the agitation of the oil is effected in the receiving chamber, while the main volume of oil is maintained at a stationary level and without agitation in the larger settling chamber of the receptacle. Now, this in the case of oil and gas other than emulsion is effected without pressure. The tendency of oil and products is to create pressure when the same is agitated in the receptacle and by the provision of the partition receptacle described herein. This agitation and the consequent increase of pressure within the receptacle is entirely eliminated and the gas is allowed to flow freely from the gas collection chamber in the minor and upper portion of the receptacle.

The treatment of emulsions, however, requires a substantial pressure within the receptacle in order that the emulsion may be broken up completely and the constituent elements thereof liberated and separated.

The pressure is maintained in the receptacle by means of the weight valve 28 which is not necessary for the treatment of the natural gas and oil.

What I claim is:

1. In an apparatus for separating gas and oil from oil wells comprising a receptacle, a vertical partition arranged in the receptacle and terminating short of the top and bottom of the receptacle, and means arranged between the said partition and a contiguous wall of the receptacle for introducing the oil from the well whereby the oil is caused to flow downwardly and around the lower end of the partition and rise on the opposite side and the gas that freely escapes from the oil rising to the top of the receptacle and collecting above the upper end of the partition, said means including an inlet oil tube arranged in the upper part of the receptacle, said tube having a surrounding discharge sleeve with a deflecting bottom plate for discharging the oil toward the receptacle wall.

2. In an apparatus for separating gas and oil from oil wells comprising a receptacle, a vertical partition arranged in the receptacle and terminating short of the top and bottom of the receptacle, and means arranged between the said partition and a contiguous wall of the receptacle for introducing the oil from the well whereby the oil is caused to flow downwardly and around the lower end of the partition and rise on the opposite side and the gas that freely escapes from the oil rising to the top of the receptacle and collecting above the upper end of the partition; said means including an inlet oil tube arranged in the upper part of the receptacle, said tube having a surrounding discharge sleeve with a deflecting bottom plate for discharging the oil toward the receptacle wall; said sleeve having upper and lower outlets for gas and oil respectively.

3. In an apparatus for separating oil and gas, a receptacle, having separate discharge means for the oil and gas, each having an exterior valve actuated by a common crank, said valves being set for one to open as the other closes and float means within the receptacle actuated by the height of the liquid, operatively connected to said crank to actuate said valves.

4. In an apparatus for separating oil and gas, the combination of a receptacle having oil inlet means, separate oil and gas outlet means comprising pipes extending from the interior of said receptacle, stop cocks arranged in said pipes, one to open as the other closes and actuated by a common crank, float means within the receptacle operatively connected to said common crank adapted to actuate the valves with reference to the height of the liquid within the receptacle.

5. In an apparatus for separating gas and oil, the combination of a receptacle, a float within the receptacle for actuating gas and oil outlet valves, said float comprising a sealed chamber, two supporting arms of equal lengths pivoted to said float at their proximal ends and pivoted to the wall of the receptacle at their distal ends to hold the chamber in substantially vertical alinement during movement thereof, the pivotal centers of said arms being off-set in vertical alinement at their distal ends, one of said arms having an extension thereon extending through the wall of the receptacle and being operatively connected to an actuating arm of said valves.

6. In an apparatus for separating gas and oil from oil wells, a receptacle having a vertical partition arranged therein and subdividing the interior of said receptacle into two separate chambers arranged for communication near the top and bottom portions thereof, and means in communication with one of said compartments for introducing the oil from a well thereinto, whereby the oil is caused to flow downwardly in said receiving chamber and into the lower portion of said other chamber and to rise on the opposite side of said partition, the gas being liberated from the oil in said receiving chamber and delivered therefrom to and discharged with the gas from the upper portion of said other chamber above the level of oil therein and accumulating therein for delivery to points externally of said receptacle.

7. In an oil and gas separating device, a receptacle for receiving the oil and gas from wells, a vertical partition fixed therein for subdividing the interior of said receptacle into a receiving chamber and a relatively larger settling chamber, said partition being arranged to afford communication near its top and bottom between said chambers, means for delivering a volume of oil and gas from a well into said receiving chamber whereby the gas may be liberated from the oil and discharged into the upper portion of and commonly discharged with the gas in said settling chamber and the oil caused to flow downwardly in said receiving chamber and into and to rise in said settling chamber, and means for regulating the supply and discharge of the oil to and from said receptacle, respectively, whereby the level of the oil in said settling chamber may be maintained at a substantially uniform elevation and substantially above the vertical center of the receptacle, for treating a maximum volume of oil therein.

8. In a gas and oil separating device for oil wells, a receptacle for receiving the oil from a well and having a vertical partition therein subdividing the interior of the receptacle into spearate chambers in communication at points near the top and bottom, the upper portion of the receptacle serving as a common receiver for the gas from both chambers, and means for supplying a volume of oil to and discharging the same from said receptacle, whereby a maximum volume of oil may be maintained at a substantially uniform level in said receptacle at a plane above the vertical center thereof, the gas liberated therefrom and accumulated above the level of the oil and the heavier constituents caused to settle to the bottom of said receptacle, as described.

9. An oil and gas separator for oil wells including a receptacle having a receiving compartment and a settling compartment arranged for communication at the top whereby the gas may be liberated from the oil introduced into said receiving compartment and discharged into the upper portion of and united with the gas in said other compartment, and also arranged for communication at the bottom whereby the oil may flow downwardly in said receiving compartment and into said other compartment and the other constituents separated therefrom.

10. An oil and gas separator for oil wells including a receptacle having an oil receiving chamber and a settling chamber, a vertical partition therebetween arranged open at the top for providing communication between said chambers, a gas outlet common to both of said chambers and means whereby a substantially uniform level of oil may be maintained in said settling chamber above the vertical center line of said receptacle.

11. An oil and gas separator for oil wells including a receptacle having an oil receiving chamber and a settling chamber arranged for communication near the top and bottom of the receptacle, and provided with a common gas outlet and float controlled means whereby the discharge of the oil from said receptacle is automatically regulated for maintaining a substantially uniform level of oil in the settling chamber, above the vertical center line of the receptacle.

12. An oil and gas separator for oil wells including a receptacle having an oil receiving chamber and a settling chamber, having a common outlet for the gas generated therein, a vertical partition therebetween arranged for affording communication between said chambers near the top and bottom of said receptacle, and float means in the upper portion of said settling chamber for regulating the discharge of the oil, whereby a substantially uniform level of oil may be maintained in said settling chamber above the vertical center line of said receptacle.

13. An oil and gas separator for oil wells including a receptacle having a vertical partition terminating short of the top and bottom thereof, and forming an oil receiving chamber and a settling chamber arranged for communication at the top in bottom of said receptacle, means for introducing a volume of oil from a well into said receiving chamber, the oil being delivered from the bottom of said receiving chamber into the bottom of said settling chamber, the gas from both of said chambers being united and commonly discharged and means whereby a substantially uniform level of oil may be maintained in said settling chamber above the vertical center line of said receptacle.

14. An oil and gas separator for oil wells including a receptacle having an oil receiving chamber and a settling chamber arranged for communication between the top and bottom of said receptacle, means for introducing a volume of oil from a well into said receiving chamber, the oil being delivered from the bottom of said receiving chamber into the bottom of said settling chamber, and float controlled means for regulating the discharge of oil from the settling chamber, whereby a substantially uniform level of oil may be maintained in the settling chamber above the vertical center line of said receptacle, the gas being liberated from the oil in said receiving chamber and being discharged into and from said settling chamber.

15. An oil and gas separator for oil wells including a receptacle having an oil receiving chamber and a settling chamber arranged for communication near the top and bottom of the receptacle, a vertical partition between said chambers, a pivoted float supported in the upper portion of said receptacle for regulating the discharge of the oil from the settling chamber, whereby a substantially uniform level of oil may be maintained in said settling chamber above the vertical center line of said receptacle.

16. An oil and gas separator for oil wells including a receptacle having an oil receiving chamber and a settling chamber arranged for communication near the top and bottom of the receptacle, a vertical partition between said chambers, a float supported in the upper portion of said receptacle for regulating the discharge of the oil from the settling chamber, whereby a substantially uniform level of oil may be maintained in said settling chamber above the vertical center line of said receptacle, and means for introducing a volume of oil from a well into the top of said receiving chamber, whereby the gas may be liberated from the oil so introduced, and discharged into the upper portion of said receptacle, above the level of the oil in the settling chamber, and a common outlet for the gas from both of said chambers.

17. An oil and gas separator for oil wells, including a receptacle having a receiving chamber therein for the reception of oil and its constituents, and a settling chamber communicating with said receiving chamber, a float mounted in the upper portion of said receptacle for regulating the discharge of the oil therefrom, whereby a substantially uniform volume and level of oil may be maintained in said settling chamber at a point above the vertical center of the receptacle.

18. An oil and gas separator for oil wells including a receptacle having a receiving chamber therein for the reception of oil and its constituents, and a settling chamber communicating with said receiving chamber, said receiving chamber and said settling chamber having a common outlet whereby the gas liberated from the oil in both chambers may be commonly discharged, a float mounted in the upper portion of said receptacle for regulating the discharge of the oil therefrom, whereby a substantially uniform volume and level of oil may be maintained in said settling chamber at a point above the vertical center of said receptacle.

19. An oil and gas separator for oil wells including a receptacle having a receiving chamber and a settling chamber in communication, a float in the upper portion of said receptacle, pivotally supported on the walls thereof, an oil discharge valve communicating with said settling chamber and externally mounted on said receptacle, and means for operatively connecting said float with said valve.

DAVID G. LORRAINE.

Witnesses.
J. W. SHEELEY,
LUTHER L. MACK.